(12) United States Patent
Coles

(10) Patent No.: US 6,895,883 B2
(45) Date of Patent: May 24, 2005

(54) POWERED BOAT HULL

(76) Inventor: Charles F. Coles, 24 Main St., Wenham, MA (US) 01984

( * ) Notice: Subject to any disclaimer, the term of this patent is extended or adjusted under 35 U.S.C. 154(b) by 0 days.

(21) Appl. No.: 10/095,036

(22) Filed: Mar. 12, 2002

(65) Prior Publication Data
US 2003/0029370 A1 Feb. 13, 2003

Related U.S. Application Data
(60) Provisional application No. 60/274,665, filed on Mar. 12, 2001.

(51) Int. Cl.$^7$ .............................. B63B 1/24; B63B 1/32
(52) U.S. Cl. ...................... 114/288; 114/274; 114/280; 114/285; 114/290
(58) Field of Search ................................ 114/271, 274, 114/278–285, 288–290, 61.1, 67 A, 67 R

(56) References Cited

U.S. PATENT DOCUMENTS

| 3,117,545 A | | 1/1964 | Warner | |
|---|---|---|---|---|
| 3,221,697 A | | 12/1965 | Allegretti | |
| 3,236,202 A | * | 2/1966 | Quady et al. ............... | 114/279 |
| 3,357,390 A | | 12/1967 | Wray, Jr. | |
| 3,372,663 A | | 3/1968 | Bue | |
| 3,424,120 A | | 1/1969 | Koriagin | |
| 3,477,400 A | | 11/1969 | Walker | |
| 3,604,384 A | * | 9/1971 | Coles .......................... | 114/274 |
| 3,661,110 A | * | 5/1972 | Pont ............................ | 114/279 |
| 3,760,756 A | * | 9/1973 | Boden ......................... | 114/289 |
| 3,763,811 A | | 10/1973 | Danahy | |
| 3,768,429 A | * | 10/1973 | Greer .......................... | 114/274 |
| 3,820,490 A | * | 6/1974 | Greer .......................... | 114/280 |
| 3,995,575 A | * | 12/1976 | Jones, Jr. ..................... | 114/280 |
| 4,237,810 A | | 12/1980 | Westfall | |
| 4,523,526 A | | 6/1985 | O'Neill | |
| 4,606,291 A | * | 8/1986 | Hoppe ......................... | 114/274 |
| 4,649,851 A | | 3/1987 | April | |
| 4,665,853 A | * | 5/1987 | Gerdsen et al. ............. | 114/274 |
| 4,715,304 A | | 12/1987 | Steinberg | |
| 4,748,929 A | * | 6/1988 | Payne .......................... | 114/280 |
| 4,756,265 A | * | 7/1988 | Lane ............................ | 114/57 |
| 4,896,621 A | * | 1/1990 | Coles .......................... | 114/274 |
| 4,951,591 A | * | 8/1990 | Coles .......................... | 114/274 |
| 5,295,453 A | * | 3/1994 | Inoue .......................... | 114/274 |
| 5,355,827 A | * | 10/1994 | Barbazash et al. .......... | 114/274 |
| 5,520,137 A | * | 5/1996 | Arii et al. .................... | 114/280 |
| 6,164,235 A | * | 12/2000 | Hoppe ......................... | 114/275 |

FOREIGN PATENT DOCUMENTS

| FR | 1421624 | | 11/1965 | |
|---|---|---|---|---|
| JP | 57110575 A | * | 7/1982 | ............. B63B/1/12 |
| JP | 60104482 A | * | 6/1985 | ............. B63B/1/28 |
| JP | 02018191 A | * | 1/1990 | ............. B63B/1/26 |
| JP | 04278894 A | * | 10/1992 | ............. B63B/1/12 |

* cited by examiner

Primary Examiner—S. Joseph Morano
Assistant Examiner—Ajay Vasudeva
(74) Attorney, Agent, or Firm—Birch Stewart Kolasch & Birch, LLP

(57) ABSTRACT

A hydrofoil craft, particularly a method of economically modifying a conventional hull with cambered foils to obtain and calculate increased lift from dense spray and to achieve enhanced craft performance is disclosed. The present invention improves speed, fuel efficiency and rough water stability, reduced pitch and vertical accelerations. A catamaran or V-bottom hull (20) is modified with chine mounted aerofoils (32, 33, 28, 28A), flexible dihedral cambered foils positioned beneath the water line and on either side of the bow (30, 31) so as to create turbulence in the forward end of a tunnel(s) (26). Fixed forward tunnel cambered foil(s) (28) and/or fixed or adjustable center tunnel cambered foils at the stern (28A) end of the tunnel (26) to generate lift from pressure caused by dense spray in the tunnel(s) (26) may also be provided.

34 Claims, 9 Drawing Sheets

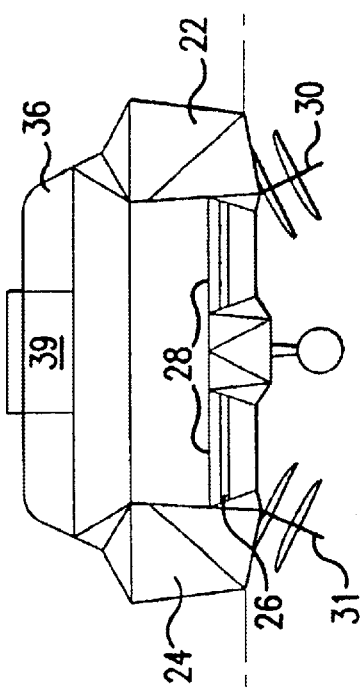
FIG.2
FIG.3
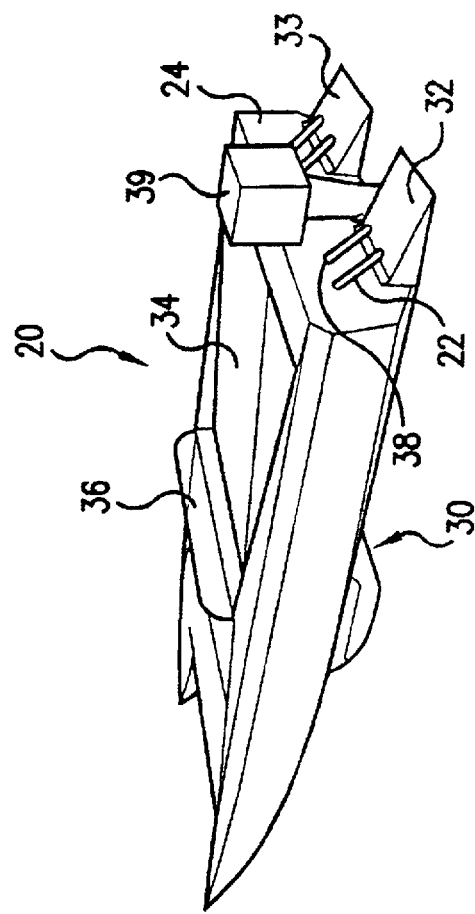
FIG.1

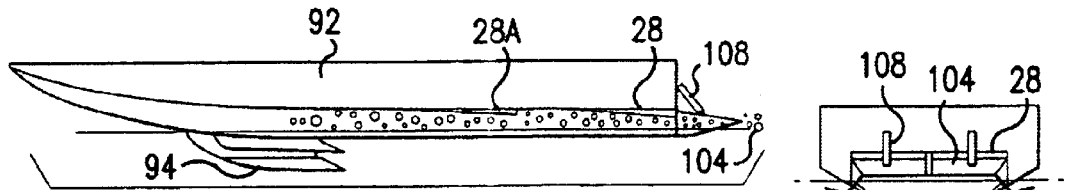
FIG.23
FIG.29
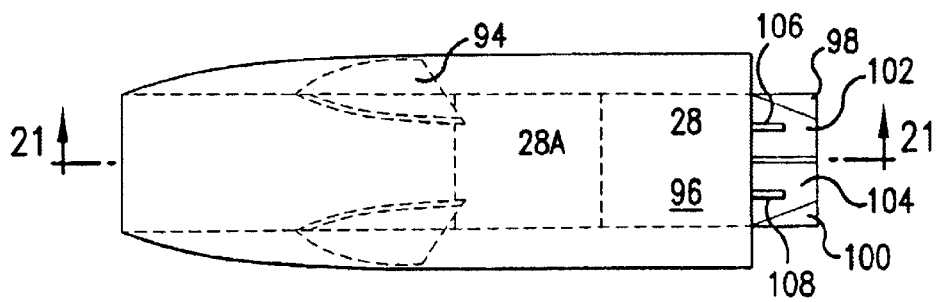
FIG.24
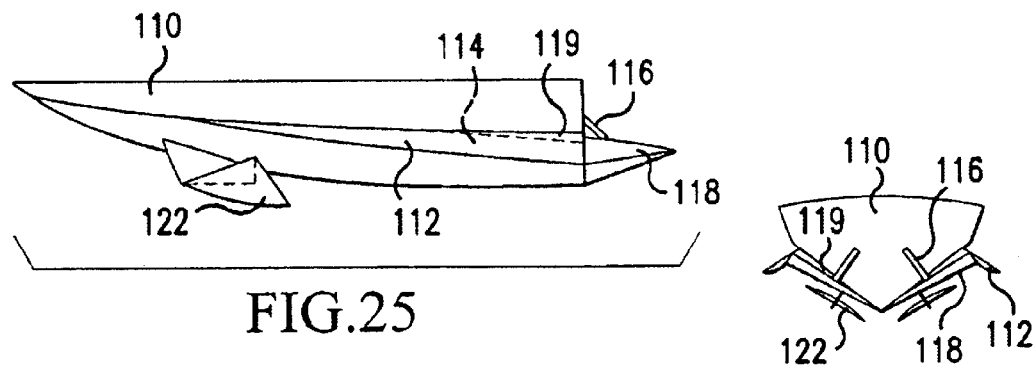
FIG.25
FIG.26
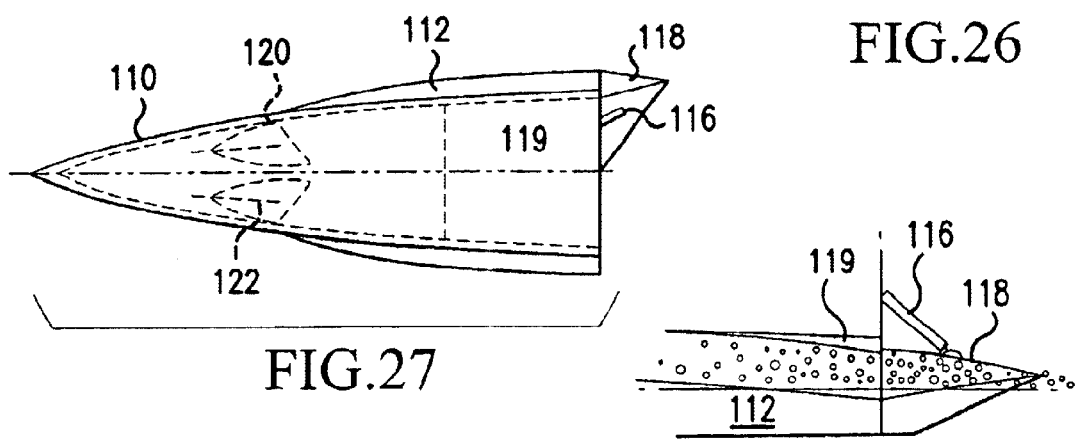
FIG.27
FIG.28

POWERED BOAT HULL

CROSS-REFERENCES TO RELATED APPLICATIONS

This nonprovisional application claims priority under 35 U.S.C. §119(e) on U.S. Provisional Application No. 60/274,665, entitled Powered Boat Hull, and filed on Mar. 12, 2001, the entirety of which is herein incorporated by reference.

BACKGROUND OF THE INVENTION

1. Field of the Invention

The present invention is related to waterborne craft, and more particularly to the use of flexible adjustable cambered foils to obtain a very high ratio of speed to horsepower by enhancing lift, performance and stability in rough water in a hydrofoil craft. The present invention is particularly applicable to all types of watercraft including, but not limited to v-bottom and catamaran boat hulls incorporating hydrofoils.

2. Description of the Background Art

A conventional, modified boat hull and method of modifying the boat hull have been described in U.S. Pat. Nos. 4,896,621 and 4,951,591 to Coles, the entirety of each of which is hereby incorporated by reference. The inventions of Coles have been described to obtain enhanced lift and rough water stability for vessels.

The method includes defining or modifying with chine aerofoil skirts an axial tunnel(s) intermediate the bow and transom of the boat hull, positioning flexible dihedral foils below the water line and on the bow so as to obstruct and create turbulence in the forward end of the tunnel while cushioning and lifting the bow. Simultaneously, the transom end of the tunnel is enclosed with stern foils so as to compress said turbulence and thereby lift the transom.

The following references generally describe the related art and are related to the aforementioned technology, specifically U.S. Pat. No. 2,989,279 (Le Bel); U.S. Pat. No. 3,763,811(Danahy); U.S. Pat. No. 3,117,545 (Warner); U.S. Pat. No. 4,237,810 (Westfall); U.S. Pat. No. 3,117,347 (Cohen et al.); U.S. Pat. No. 4,523,526(Smoot); U.S. Pat. No. 3,131,436 (Lathers et al.); U.S. Pat. No. 4,606,291 Hoppe; U.S. Pat. No. 3,221,697 (Allegretti); U.S. Pat. No. 4,649,851 (April); U.S. Pat. No. 3,357,390 (Wray); U.S. Pat. No. 4,665,853 (Gerdsen et al.); U.S. Pat. No. 3,372,663 (Lo Bue); U.S. Pat. No. 4,715,304 (Steinberg); U.S. Pat. No. 3,424,120 (Koriagin); U.S. Pat. No. 4,496,621 (Coles); U.S. Pat. No. 3,477,400 (Walker); U.S. Pat. No. 4,951,591 (Coles); and U.S. Pat. No. 3,604,384 (Coles). Foreign Patent Documents 477050(Australia), 124594 (New Zealand), and 1421624 (France) are also related to the background of the invention.

The present inventor has discovered that there are numerous shortcomings with the related art that, as overcome by the present invention, will result in superior vessel design to obtain a very high ratio of speed to horsepower by enhancing lift, performance and stability in rough water, particularly with respect to a hydrofoil craft.

SUMMARY OF THE INVENTION

The present invention overcomes the shortcomings associated with the background art and achieves other advantages not realized by the background art.

An aspect of the invention is to provide a method of modifying and designing a boat hull to obtain and calculate enhanced lift, performance and rough water stability. The method to obtain enhanced performance includes defining or modifying with chine aerofoil skirts and axial tunnels intermediate the bow and transom of the boat hull, positioning flexible dihedral cambered foils below the waterline and on the bow so as to create a turbulence in the forward end of the tunnel. This turbulence mixes water and air to generate a dense spray that lifts the bow while cushioning shock. The method may also include positioning fixed or adjustable cambered foils at the stern end of the tunnel to generate lift from the dense spray in the tunnels. Alternatively, or in conjunction with the other foil arrangements, the method may include enclosing the transom end of the tunnels with a rigid adjustable cambered airtight foil to compress dense spray, lift the transom and dampen pitch to prevent the bow from diving in a rough sea.

The aforementioned method is particularly advantageous in creating a hydrofoil system for a modified hull in order to obtain excellent stability and performance at high speeds in rough water as a result of substantial lift. The present invention creates hydrodynamic lift from the twin swept back surface piercing flexible forward cambered hydrofoils. Hydrodynamic lift from tunnel(s) on a catamaran hull or a V bottom hull modified with chine-mounted aerofoils, tunnel mounted cambered foils and/or stern cambered foils is also created by compressing the flow of dense spray at a high velocity with the cambered tunnel(s) and stern foil(s). Lift is created in the tunnel cambered foil(s), on the chine mounted aerofoils and stern cambered foils from the high velocity, dense spray when the transom end of the tunnels is restricted by the stern cambered foil(s).

Another aspect of the present invention includes a method for calculating the amount of enhancement of performance from modifying the boat with the cambered bow, tunnel and stern foils, comprising (a) defining before modification the boat height above water, trim, wetted surface, drag and weight vs horsepower and speed; (b) defining modifications of bow, forward, center and stern cambered foils; (c) defining cambered foil lift; (d) defining cambered foil drag; (e) defining after modification of cambered foils hull lift; (g) defining speed vs horsepower before and after modification.

The substantial lift generated by the dense spray and the foil system of the present invention reduces the rough water wave profile impacted by the hull, so as to reduce the wave shock and improve hull stability and performance at high speeds. Accordingly, the present invention reduces power requirements and hull structural strength and weight minimum requirements.

Another aspect of the present invention is the implementation of a watercraft trim control system that effectively and safely contributes to craft operation. Trim changes of the engine shaft change the angle of attack of the bow cambered foils and raise or lower the bow. Raising or lowering the rigid airtight cambered stern foils raises or lowers the stern. Trim control of the hull is essential to reduce the danger of pitching up or down at high speeds in a rough sea.

An additional aspect of the present invention is directed toward a hydrofoil craft, particularly a method of economically modifying a conventional hull with cambered foils to obtain and calculate increased lift from dense spray and enhanced performance. The present invention improves speed, fuel efficiency and rough water stability, reduced pitch and vertical accelerations. The method of obtaining enhanced performance is characterized by defining an axial tunnel(s) intermediate the bow and transom of a catamaran hull or a V-bottom hull modified with chine mounted aerofoils; positioning flexible dihedral cambered foils beneath the water line and on either side of the bow so as to create a turbulence in the forward end of the tunnel that mixes water and air to generate a dense spray that lifts the bow while cushioning shock. Fixed forward tunnel cambered foil(s) and/or fixed or adjustable center tunnel cambered foils positioned at the stern end of the tunnel to generate lift from pressure caused by dense spray in the tunnel(s) are also included in the present invention. The present invention may also include simultaneously or alternatively enclosing the transom end of the tunnel(s) with a rigid adjustable, vertically and or in angle of attack, cambered foils to compress the dense spray and lift the transom.

These and other aspects of the invention are specifically accomplished by a boat hull comprising a bow and a stern; a waterline extending between the bow and the stern; at least one tunnel extending axially in a direction from the bow toward the stern and having a forward end, a center region and an aft end; a pair of flexible cambered foils, the flexible cambered foils supported on sides of the bow beneath the water line, the flexible cambered foils being capable of controlling a flow within the at least one tunnel and creating a dense spray in an end of the tunnel while cushioning shock and lifting the bow; and at least one fixed, cambered foil at the after or the forward end of the at least one tunnel generating lift from a pressure being generated by the dense spray within the at least one tunnel.

These and other aspects of the invention are also accomplished by a boat hull comprising a bow and a stern, the stern including a transom; a waterline extending between the bow and the stern; a pair of tunnels extending axially in a direction from the bow toward the stern and having a forward end, a center region and an aft end; a pair of flexible cambered foils, the flexible cambered foils supported on sides of the bow beneath the water line, the flexible cambered foils being capable of controlling a flow within the at least one tunnel and creating a dense spray in an end of the tunnel while cushioning shock and lifting the bow; and at least one pair of cambered tunnel foils at the after or forward ends of the tunnels, respectively, wherein each of the tunnels includes a respective tunnel foil generating lift from a pressure being generated by the dense spray within the at least one tunnel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not intended to limit the present invention to the embodiments shown, and wherein:

FIG. 1 is a side perspective view of a catamaran hull modified according to an embodiment of the present invention;

FIG. 2 is a rear elevation view of the catamaran hull of FIG. 1;

FIG. 3 is a front elevation view of the catamaran hull of FIG. 1;

FIG. 23 is a side elevation view of a twin tunnel hull having bow cambered foils, forward tunnel cambered foils, center tunnel cambered foils and a pair of stern cambered foils according to an embodiment of the present invention;

FIG. 24 is a plan view of the hull shown in FIG. 23;

FIG. 25 is a side elevation view of a V-bottom or rigid inflatable hull modified with a chine aerofoil skirt to define axial tunnels influenced by the cambered bow foils, cambered center tunnel foils and cambered adjustable stern foils;

FIG. 26 is a rear elevation view of the V-bottom hull shown in FIG. 25;

FIG. 27 is a plan view of the V-bottom hull shown in FIG. 25;

FIG. 28 is a partial, side elevation view of the V-bottom hull shown in FIG. 25, demonstrating compression of tunnel turbulence and dense spray by stern foils.

FIG. 29 is a rear view of the boat hull shown in FIG. 23; and

DETAILED DESCRIPTION OF THE PREFERRED EMBODIMENTS

The present invention will hereinafter be described with reference to the accompanying drawings. Hereinafter, the present invention will be described in detail with reference to the accompanying drawings. The present invention is an improvement over previous waterborne craft hulls available in the related art. The details and arrangements found in U.S. Pat. Nos. 4,896,621, 4,951,591, and 3,604,384 all to the inventor of the present invention Coles, are hereby incorporated in their entirety by reference into the present application.

Although the present invention is directed toward any waterborne craft, boat, ship or other type of vessel, the following description will employ the use of the terms boat and hull for simplicity. In addition, one of ordinary skill in the art will appreciate that the following description relies upon terms generally understood in the related art, including but not limited to forward, stern, bow, stern, transom, camber, lift, starboard, port and waterline(s). One of ordinary skill in the art will appreciate that a waterline is typically the line of the water's edge when a waterborne craft is afloat, technically the intersection of any horizontal plane with the molded form of the ship. In practice, the designer anticipates the preferred operation of the vessel and the positioning of the waterline based upon vessel dimension, loading sea state, etc.

The present invention is particularly suited to a catamaran type of hull readily fabricated from metal or molded plastic material and modified to include a tunnel(s) defined between two hull sections or pontoons. Alternatively, the present invention is equally applicable to a V-bottom type of hull having pairs of cambered foils fore-and-aft adapted to be acted upon both by a water stream and a dense spray in order to assist in lifting the hull when the boat is under power. One of skill in the art will appreciate that variations and/or combinations including features of both V-bottom and catamaran hulls are anticipated by the present invention.

As aforementioned, the bow foils on the bow of a boat may be formed as surface piercing cambered hydrofoils and shaped so that they cooperate in creating turbulence, e.g., in the form of a dense spray in a flow stream passing thru the tunnel(s) while assisting in increasing the lift of the hull which is largely out of the water when the boat is traveling at a relatively high speed. A highly desirable combination of lift and stability may be provided by various combinations of bow surface piercing cambered hydrofoil(s), forward fixed tunnel cambered foil(s) and/or center fixed or adjustable tunnel cambered foil(s) and adjustable, rigid, airtight, cambered foil(s) applied to a hovercraft skirt or hull. A catamaran hull embodiment and a v-bottom hull or rigid inflatable hull embodiment of the present invention will be described hereinafter in greater detail with reference to the accompanying drawings.

Catamaran Hull Embodiment

Figure 4:
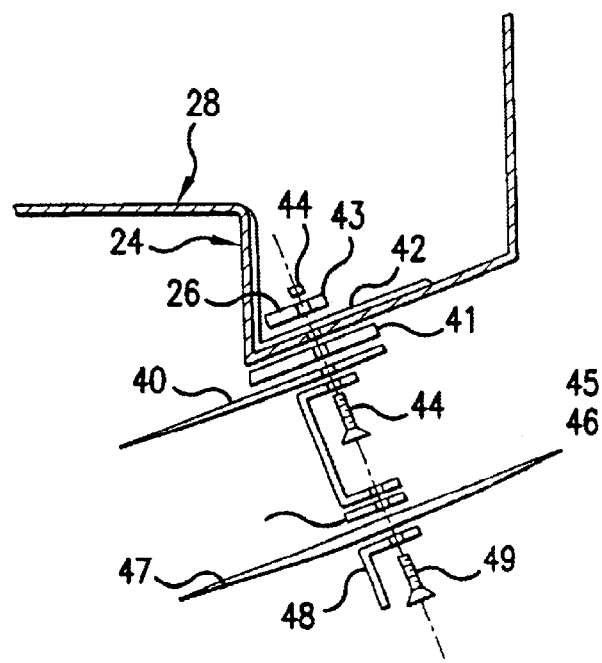
FIG. 4 is a partial, exploded, front sectional view, showing the fitting of twin flexible cambered foils adjacent to a bow of a boat according to the present invention.
Figure 5:
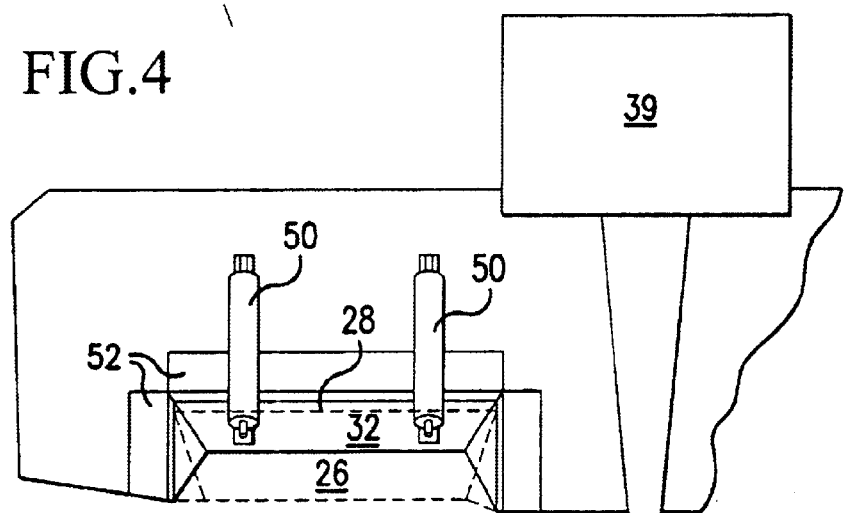
FIG. 5 is a fragmentary rear elevation view showing a stern cambered foil, rigid hovercraft type skirt according to an embodiment of the present invention.
Figure 6:
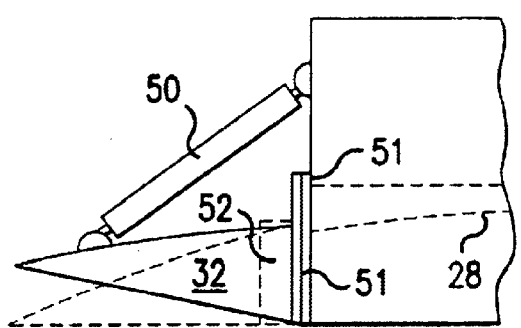
FIG. 6 is a fragmentary side elevation view showing a rigid adjustable cambered foil hovercraft type skirt.
Figure 7:
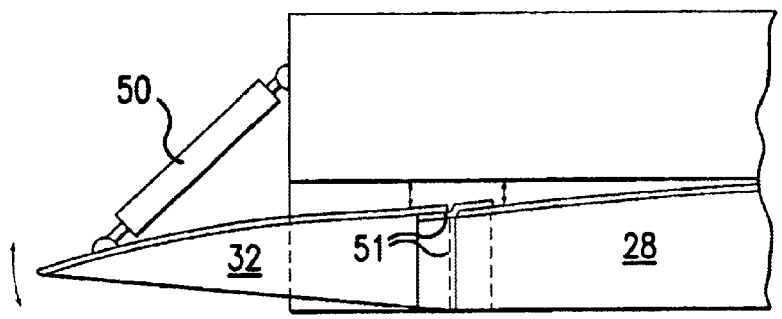
FIG. 7 is a fragmentary side elevation view showing a tunnel with a center adjustable cambered foil and a rigid adjustable, cambered stern foil having a forward end in the tunnel according to an embodiment of the present invention.
Figure 8:
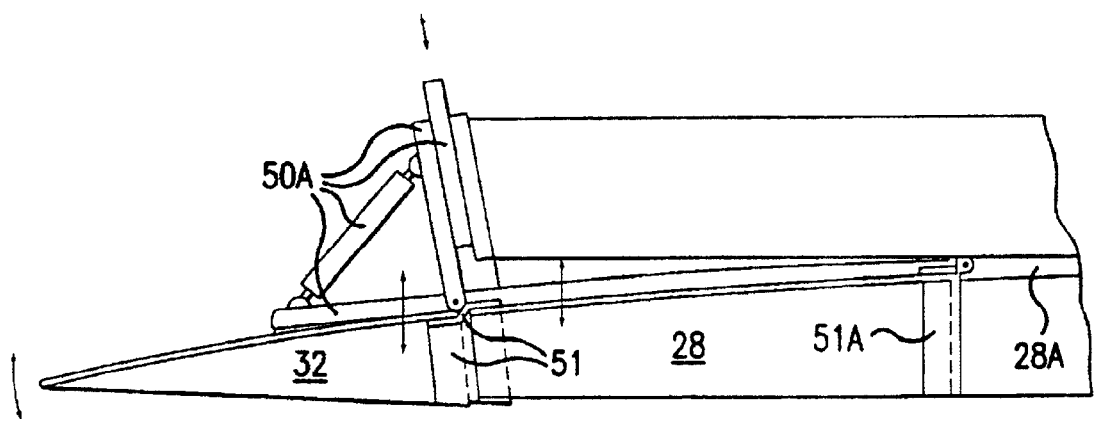
FIG. 8 is a fragmentary side elevation view showing a tunnel with a forward, fixed cambered foil, a tunnel center adjustable cambered foil, and a rigid adjustable cambered stern foil.

FIG. 1 is a side perspective view of a catamaran hull modified according to an embodiment of the present invention. FIG. 2 is a rear elevation view of the catamaran hull of FIG. 1. FIG. 3 is a front elevation view of the catamaran hull of FIG. 1. FIG. 4 is a partial, exploded, front sectional view, showing the fitting of twin flexible cambered foils adjacent to a bow of a boat according to the present invention. FIG. 5 is a fragmentary rear elevation view showing a stern cambered foil, rigid hovercraft type skirt according to an embodiment of the present invention. FIG. 6 is a fragmentary side elevation view showing a rigid adjustable cambered foil hovercraft type skirt. FIG. 7 is a fragmentary side elevation view showing a tunnel with a center adjustable cambered foil and a rigid adjustable, cambered stern foil having a forward end in the tunnel according to an embodiment of the present invention. FIG. 8 is a fragmentary side elevation view showing a tunnel with a forward, fixed cambered foil, a tunnel center adjustable cambered foil, and a rigid adjustable cambered stern foil, wherein the center and stern foils may be adjusted by a hydraulic jack and trim plate mounted on a vessel transom.

FIGS. 1, 2, 3 and 13 show a catamaran hull 20 having integral port and starboard pontoons 23, 24, respectively. The hull 20 may be fabricated or molded intergrally of a plastic material conventionally known in the related art for boat hulls, such as polyurethane and/or its equivalents. Regardless of the mode of construction, the pontoons 22 and 24 form between them an axial tunnel 26. The axial tunnel 26 may include fixed or adjustable cambered center foils 28, cooperatively associated with pairs of bow flexible cambered foils 30, 31, and a pair of adjustable, rigid, cambered stern foils 32, 33. The form, function and mode of operation of the bow foils 30, 31, center foils 28 and stern foils 32, 33 are explained in greater detail hereinafter.

The hull 20 may include an open cockpit 34, furnished with a windshield 36. At the rear of the cockpit 34, a transom 38 for closing the cockpit 34 and reinforced to support an outboard motor 39 and/or alternatively an inboard, outboard drive or jet drive of reasonably small power for speeds which are obtained in rough water is also provided. As shown in all views, bow port 30 and bow starboard cambered foils 310, 31 are separately attached, e.g. with bolts, to exterior pontoon surfaces.

Similarly forward and center tunnel cambered foils 28, 28A, and aft port 32 and aft starboard cambered foils 33 are individually secured to the hull in similar manners. As shown in FIG. 4, a preferred embodiment indicates that the starboard cambered foil assembly 31 may include a main cantilevered, flexible cambered metal foil 40, a rubber shock pad 41 to reduce shock and fatigue of the metal foil 40, reinforcing material 42 in the starboard pontoon 24, a bolt plate 43, and a bolt and lock nut assembly 44. In addition, the foil assembly 31 may include a channel 45, rubber shock pad 46, a lower cantilevered flexible cambered foil 47, rubber shock fence 48 for added directional stability and seating of a second bolt and lock nut assembley 49. The bolt assemblies 44, 49 allow the entire foil assembly or only the lower foil 47 and fence 48 to be easily removed for replacement and/or repair. The cambered foils 40 and 47 bend in torsion, and therefore may be replaced with larger or smaller foils depending on individual hull requirements for higher speed or rough water operation.

FIG. 5 shows a stern cambered foil 32 that can be raised or lowered by hydraulic or pneumatic rams 50. For example, when the boat is traveling at high speeds into surface winds, the density of the spray, pressure and lift is reduced under the forward and/or center tunnel cambered foils 28, 28A when the stern cambered foil 32 in the form of a hovercraft skirt is raised. When foil 32 is lowered, the density of the spray, pressure and lift is increased on the forward and or center tunnel foil 28, 28A and stern foils 32 and 33.

As shown in FIG. 6, stern foils 32 and 33 are attached to hull pontoons 22 and 24 with a gasket 51 held in place with a clamp 52 to prevent air escaping between the stern foil 32, center foil 28 and hull pontoon 22. Increasing hull lift by lowering stern foil 32 reduces shock when traveling into the wind in rough water, accordingly demonstrating an increased wave frequency and profile. The design of the stem foil present invention tends to prevent the foil from being lifted above the surface of the water and the propellers from cavitating during operation.

FIG. 7 shows an alternate design with the forward end of the cambered stern foil 32 in the tunnel, with gasket 51 preventing the spray from escaping between the fixed center tunnel cambered foil 28, stern cambered foil 32 and the sides of the tunnel. FIG. 8 shows a stern bracket 50A that can be adjusted upwardly and downwardly to raise or lower the stern cambered foil 32 and the center cambered tunnel foil 28. The trim angle of the cambered stern foil can also be adjusted with the present invention. Gasket 51 prevents spray from escaping between the adjustable center cambered tunnel foil 28 and the adjustable stern cambered foil 32. Gasket 51A prevents the spray from escaping between the fixed forward cambered tunnel foil 28A and the adjustable center cambered tunnel foil 28.

Figure 9:
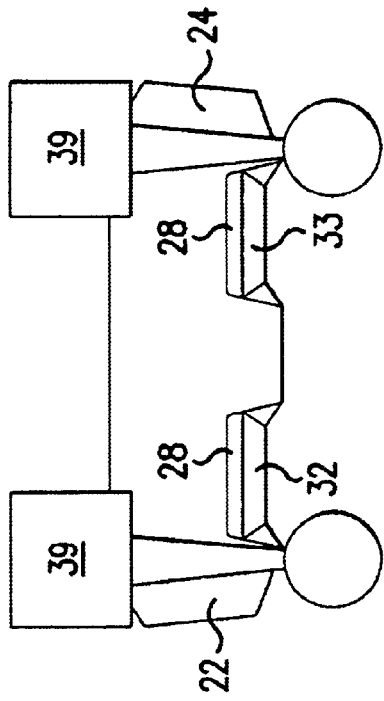
FIG. 9 is a rear elevation view of a twin tunnel hull construction having a single rear engine according to an embodiment of the present invention.
Figure 11:
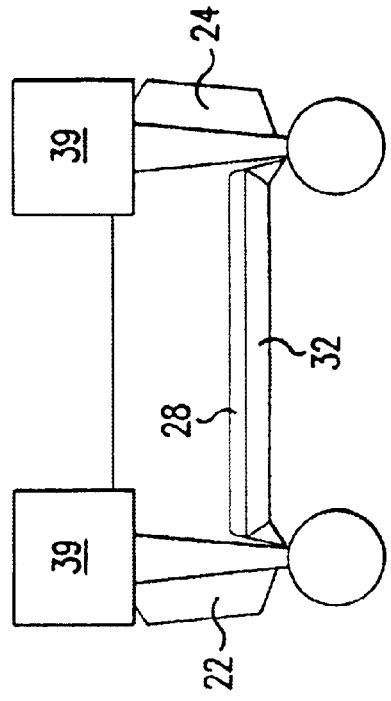
FIG. 11 is a rear elevation view of a modified twin tunnel construction having a single rear engine according to an embodiment of the present invention.
Figure 10:
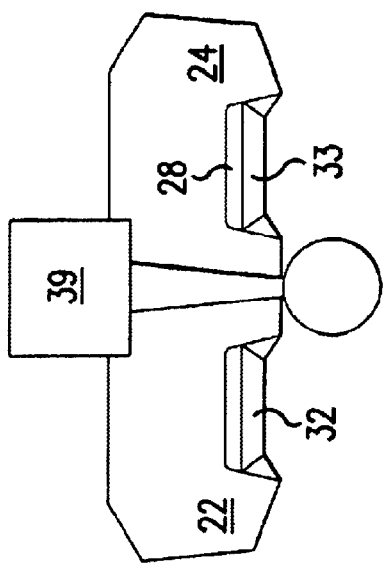
FIG. 10 is a rear elevation view of a twin tunnel hull construction having a duel rear engine according to an embodiment of the present invention.
Figure 12:
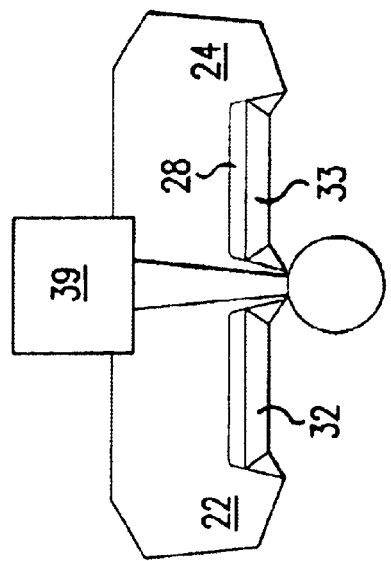
FIG. 12 is a rear elevation view of a hull having a single tunnel with twin engines according to an embodiment of the present invention.
Figure 13:
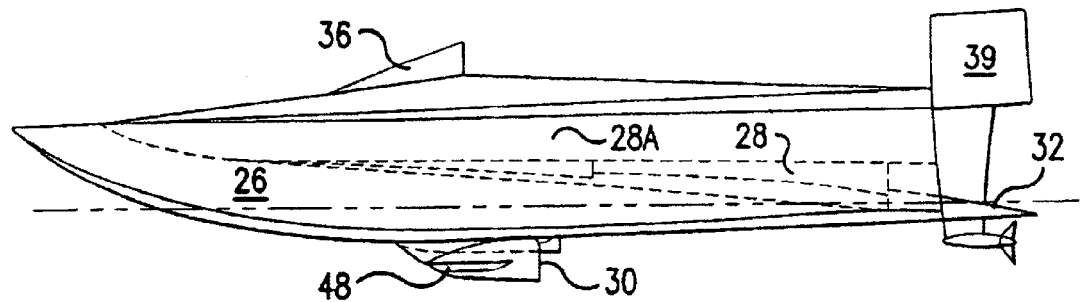
FIG. 13 is a partial, side elevation view, partially in phantom of the catamaran hull of FIG. 1 having pairs of bow, forward and center tunnel, and stern cambered foils according to an embodiment of the present invention.

FIG. 9 is a rear elevation view of a twin tunnel hull construction having a single rear engine according to an embodiment of the present invention. FIG. 10 is a rear elevation view of a twin tunnel hull construction having a duel rear engine according to an embodiment of the present invention. FIG. 11 is a rear elevation view of a modified twin tunnel construction having a single rear engine according to an embodiment of the present invention. FIG. 12 is a rear elevation view of a hull having a single tunnel with twin engines according to an embodiment of the present invention. FIG. 13 is a partial, side elevation view, partially in phantom of the catamaran hull of FIG. 1 having pairs of bow, forward and center tunnel, and stern cambered foils according to an embodiment of the present invention.

FIG. 9 shows rear cambered foils 32 and 33 and center cambered tunnel foils 28 mounted on a twin tunnel hull 20 powered by a single engine 39. FIG. 10 shows foils 32, 33 and 28 mounted on a twin tunnel hull 20 powered by two engines 38, 39, and FIG. 12 shows a single stern foil 32 and single center tunnel foil 28 mounted on a single tunnel hull 20 having two engines 38, 39. FIG. 11 shows foil 32, 33 and 28 mounted on a twin tunnel hull with a single engine and relatively larger tunnels 26.

Figure 14:
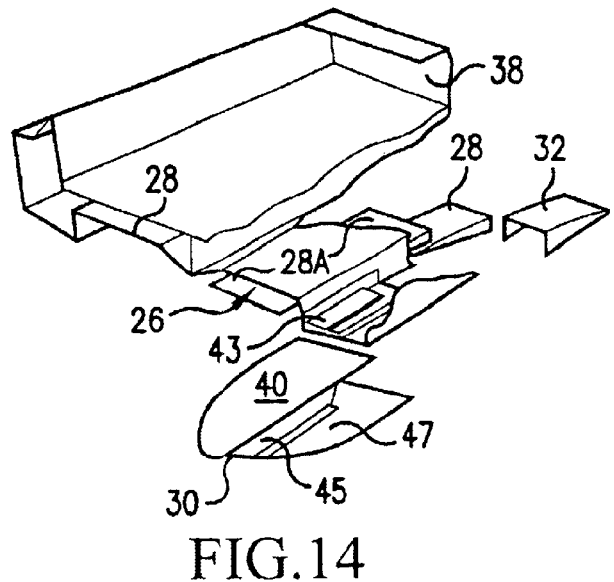
FIG. 14 is a fragmentary sectional view showing the fitting of cambered foils adjacent the bow, forward in the tunnel, aft in the tunnel and at the stern in a position intersecting the tunnel according to an embodiment of the present invention.
Figure 15:
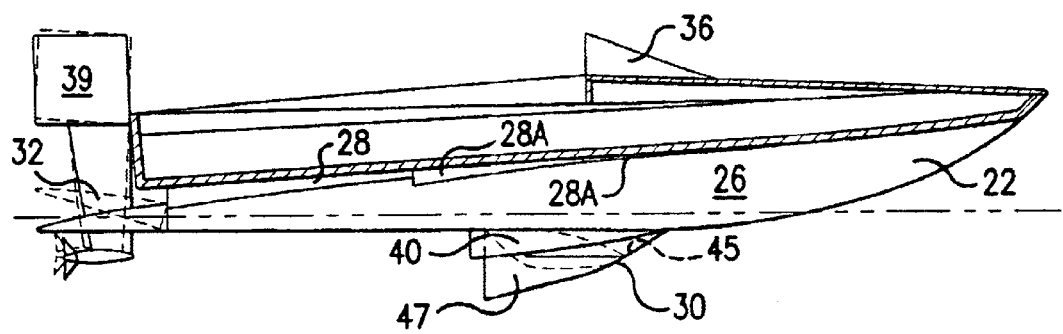
FIG. 15 is a longitudinal sectional view of the boat hull of the present invention shown in FIG. 13 underway at relatively low speeds.
Figure 16:
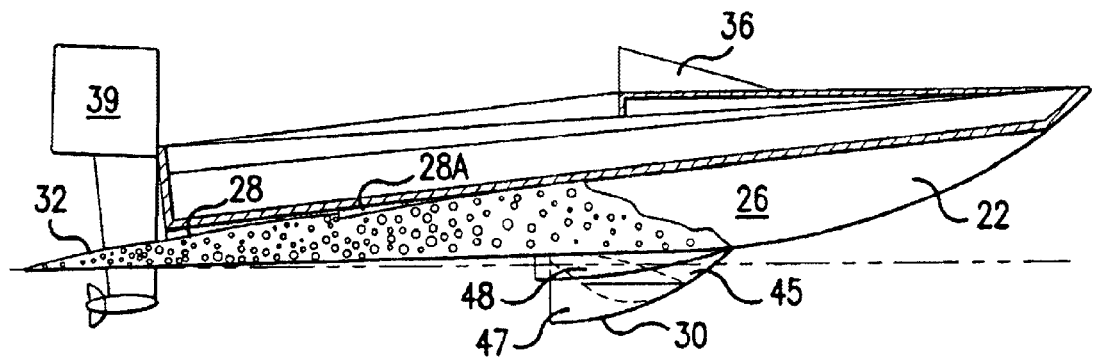
FIG. 16 is a longitudinal sectional view showing the boat hull of the present invention shown in FIG. 13 underway at high speed with a stern foil closed so as to compress the dense spray within a tunnel.
Figure 17:
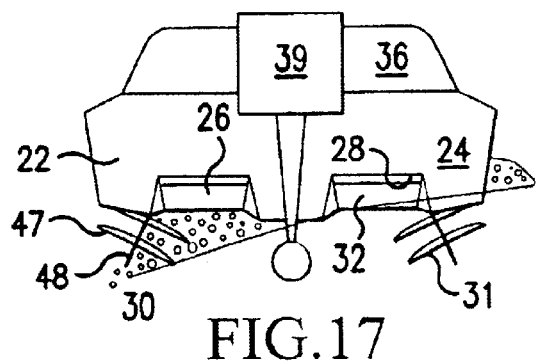
FIG. 17 is the rear elevation view of the boat shown in FIG. 16.
Figure 18:
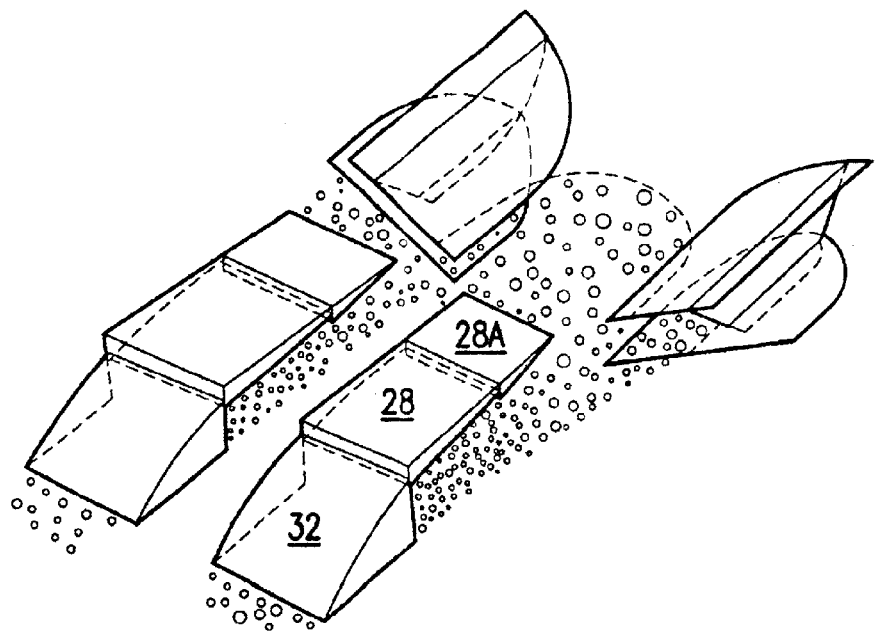
FIG. 18 is a schematic exploded view of the boat shown in FIGS. 13, 15 and 16, and having the pairs of bow foils, forward tunnel foils, center tunnel foils and stern foils.
Figure 19:
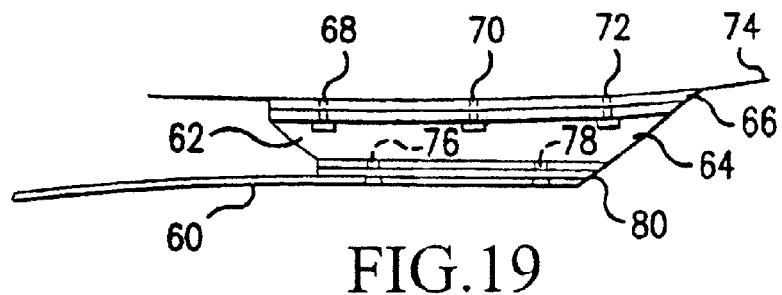
FIG. 19 is a fragmentary side elevation view of a flexible cambered bow foil according to an embodiment of the present invention.
Figure 20:
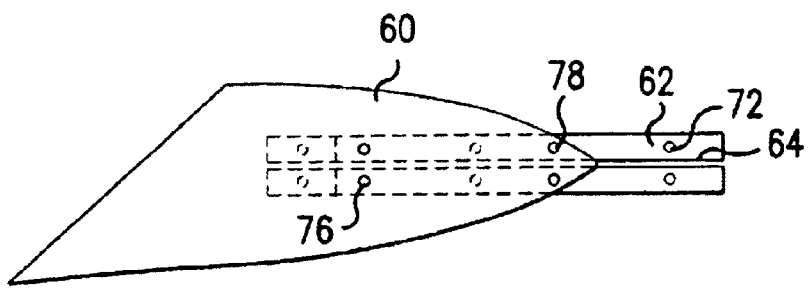
FIG. 20 is a bottom plan view of the cambered foil shown in FIG. 19.

FIG. 14 is a fragmentary sectional view showing the fitting of cambered foils adjacent the bow, forward in the tunnel, aft in the tunnel and at the stern in a position intersecting the tunnel according to an embodiment of the present invention. FIG. 15 is a longitudinal sectional view of the boat hull of the present invention shown in FIG. 13 underway at relatively low speeds. FIG. 16 is a longitudinal sectional view showing the boat hull of the present invention shown in FIG. 13 underway at high speed with a stern foil closed so as to compress the dense spray within a tunnel. FIG. 17 is the rear elevation view of the boat shown in FIG. 16. FIG. 18 is a schematic exploded view of the boat shown in FIGS. 13, 15 and 16, and having the pairs of bow foils, forward tunnel foils, center tunnel foils and stern foils. The turbulence and dense spray created by the bow foils and the compression of this turbulence in the tunnels and by the tunnel foils and stern foils enclosing the tunnels, is illustrated by increasing bubble density at the after end of the flow stream. FIG. 19 is a fragmentary side elevation view of a flexible cambered bow foil according to an embodiment of the present invention. FIG. 20 is a bottom plan view of the cambered foil shown in FIG. 19.

As illustrated in FIGS. 13 to 16, the bow cambered foils 30, 31, the air tight tunnel forward and center cambered foils 28,28A and air tight stern cambered foils 32, 33 cooperate with the tunnel 26 to provide lift to the hull generated by water and dense spray. The water and air generated in part by the bow foils 30, 31 combine to form the dense spray that provides pressure that gives lift to the cambered foils. Pressure data was obtained from during sea trials by using pitot tubes to determine the pressure on the different cambered bow 30,31, forward and center tunnel 28, 28A, and stem foils 32, 33. Lift and drag of the different foils, appendages and hull were calculated by regression formulae on a computer relating pressure to spray density, speed, height above water, angle of attack, length, beam, camber and lift coefficient. Additional details of these trials and experimental results are provided in greater detail in the accompanying TABLES described hereinafter.

When the boat hull 20 is in the position shown in FIG. 16 while being operated at high speed, dense spray and waves are compressed in the rearward portion of the tunnel and stern foil, while directly and indirectly exerting an upward lifting force. The water and dense spray at large velocity being compressed by the motion of the boat between the walls of the tunnel(s) 26 in the rear and on the cambered tunnel foils 28, 28A and air tight stern foils 32, 32 exert considerable lift.

In FIG. 19, the construction of a flexible cambered forward foil 60 which is mounted upon a channel or I-beam 62, includes a camber and swept back configuration such that the foil passes over debris without damage and bends under torsion so as to reduce fatigue stress/failure from bending. The leading edge 64 of the channel or I-beam 62 is inclined downwardly and aft so as to reduce drag and a shock pad 66 is fitted intermediate the channel or I-beam 62 and the hull exterior 74 prior to fastening through bolts 68, 70 and 72. Similarly shock pad 80 may be secured between channel or I-beam 62 and the cambered foil 60 by means of through holes 76, and 78.

V-Bottom Hull or Rigid Inflatable Hull Embodiment

Figure 21:
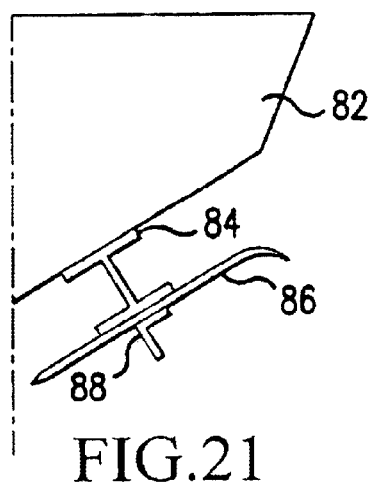
FIG. 21 is a fragmentary end elevation view of an embodiment having a bow foil positioned on a V-bottom boat hull.
Figure 22:
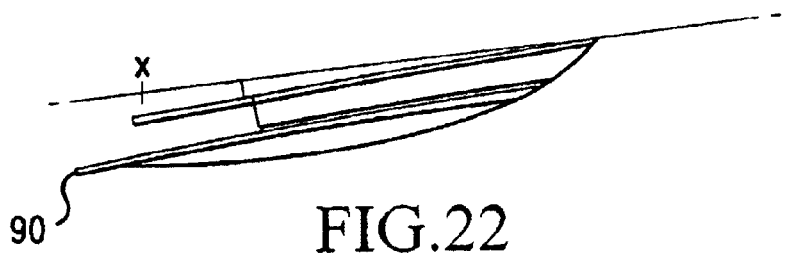
FIG. 22 is a schematic view of the of shims or hydraulic means to adjust the angle of attack (x) of a cambered bow foil according to the present invention.
Figure 30:
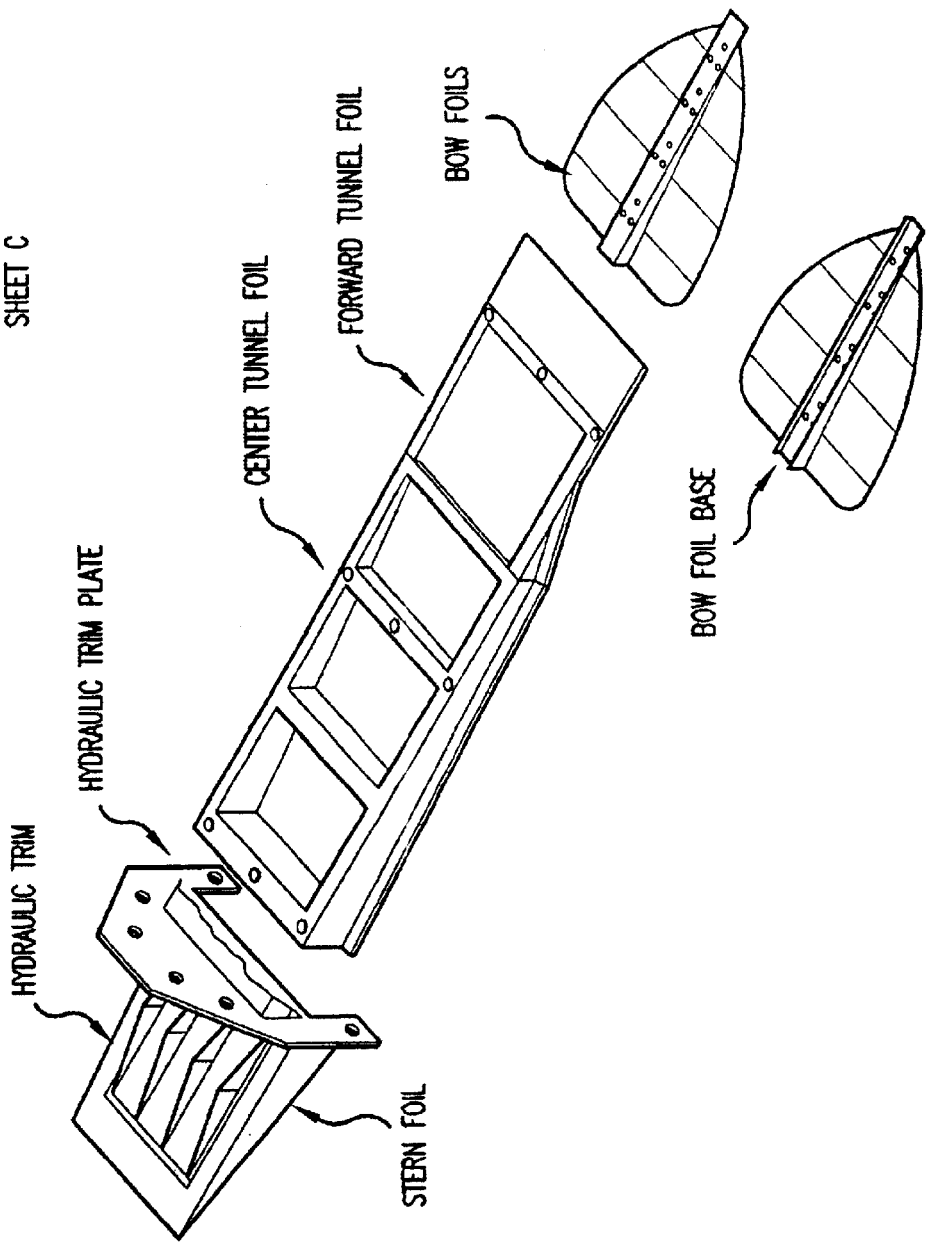
FIG. 30 is a side view according to an embodiment of the present invention.

FIG. 21 is a fragmentary end elevation view of an embodiment having a bow foil positioned on a V-bottom boat hull. FIG. 22 is a schematic view of shims or hydraulic means to adjust the angle of attack (x) of a cambered bow foil according to the present invention. FIG. 23 is a side elevation view of a twin tunnel hull having bow cambered foils, forward tunnel cambered foils, center tunnel cambered foils and a pair of stern cambered foils according to an embodiment of the present invention. FIG. 24 is a plan view of the hull shown in FIG. 23. FIG. 25 is a side elevation view of a V-bottom or rigid inflatable hull modified with a chine aerofoil skirt to define axial tunnels influenced by the cambered bow foils, cambered center tunnel foils and cambered adjustable stern foils. FIG. 26 is a rear elevation view of the V-bottom hull shown in FIG. 25. FIG. 27 is a plan view of the V-bottom hull shown in FIG. 25. FIG. 28 is a partial, side elevation view of the V-bottom hull shown in FIG. 25, demonstrating compression of tunnel turbulence and dense spray by stern foils. FIG. 29 is a rear view of the boat hull shown in FIG. 23. FIG. 30 is a side view according to an embodiment of the present invention.

FIG. 21 shows the placement of forward cambered foil 86 on a V-bottom hull 82 with channel or I-beam 84, and includes an angle fence 88. FIG. 22 is a schematic side view designating the angle of attack (x) of the bow cambered foil which may be adjusted by means of rubber shims or hydraulic controls (not illustrated). FIGS. 23, 24 and 29 detail a single tunnel 96 construction, having bow mounted cambered foils 94, a forward tunnel cambered foil 28A, a center tunnel cambered foil 28 and stern cambered foils 102,104 hydraulically actuated by struts 106, 108.

Rigid hovercraft type airtight skirts 98, 100 may also be employed to enclose the transom end of the tunnel. As illustrated in FIGS. 25–29, in addition to the forward cambered foils 122 mounted beneath the V-bottom hull or rigid inflatable hull 110, it is possible to obtain even greater lift and stability from dense spray and pressure by the use of wing-like, longitudinal chine or bottom mounted air tight aerofoils 112 mounted between the chine or bottom and skeg of the hull from mid section to the stern to generate two tunnels to generate lift from the already described cambered foils.

As in the above-described construction the center tunnel cambered foil 119 may be adjustable and the stern cambered foil 118 may be actuated by hydraulic cylinder 116. Experimental testing of various aspects of the present invention indicate that unique and highly beneficial results are obtained by the aforementioned embodiments and variations thereof.

The following appendices are additionally provided and show various experimental results, test data and operational performance data according to various embodiments of the present invention. The details of which will be described in detail hereinafter.

TABLE I

Method for Calculating Performance
Three flexable cambered tunnel foils and
two flexable cambered bow foils

| | Cambered tunnel foils | | | Cambered bow foils | Hulls | Prop | Total |
|---|---|---|---|---|---|---|---|
| | Stern | Center | Fwd | | | | |
| A Design | | | | | | | |
| Number | 1 | 1 | 1 | 2 | | | |
| Length ft | 3 | 5 | 2.7 | 3 | 7.6 | | |
| Beam aft | 2 | 2 | 2 | 2 | 2.9 | | |
| Aspect ratio B/L | 0.67 | 0.4 | 0.74 | 0.67 | | | |
| Camber Cld | 0.1 | 0.1 | 0.1 | 0.1 | | | |
| Trim vs WL deg | 3 | 3 | 8 | 3 | 3 | | |
| Spray flo | 3 | 3 | 8 | | | | |
| Wetted vert(9) | 3 | 5.4 | 46.8 | 3 | | | |
| Weight(4) | | | | | | | 10000# |
| Power | | 2.200 hp Yamaha 400 hp@ 5500 rpm | | | | | |
| Propulsive horse power | | 400 × .6 = 240 hp | | | | | 240 |
| B Performance @ 45 k | | | | | | | |
| Clb(1) | | 0.121 | 0.137 | 0.115 | | 0.1 | |
| Lift/drag(1) | 10.2/1 | 9/1 | 9.6/1 | 10/1 | | 8.84/1 | |
| (b) Velocity 45 k- 76.01 f/s | | | | | | | |
| Pressure (2) | 3508 | 3549 | 213 | 5742 | 5742 | | |
| Lift (3) Initial | 1698 | 1944 | 98 | 4594 | 6084 | | 14418 |
| Revised | 1698 | 1944 | 98 | 2584 | 3670 | | 9994 |
| Drag (3) Horizontal | 166 | 213 | 10 | 258 | 117 | | 764 |
| (10) Vertical | 12 | 25 | 2 | 8 | 48 | | 95 |
| Residual | | | | | 321 | | 321 |
| | 178 | 238 | 12 | 266 | 486 | | 1180 |
| Lift required | 10000/9994 = 1.0006 | | | | | | |
| | 1698 | 1944 | 98 | 2590 | 3670 | | 10000 |
| Drag | 178 | 238 | 12 | 266 | 486 | | 1180 |
| Appendage (12) | | | | | | | 94 |
| Wind (13) | | | | | | | 437 |
| | | | | | | | 1711 |

| 10000# Craft weight | With foils | No foils |
|---|---|---|
| Speed mph | 51.8 | 41 |
| Propulsive HP required = velocity f/s × drag/550 = 76.01 × 1711/550 = | 236 hp | 240 |
| Propulsive HP available = 2.200 HP Yamaha = 400 × 6 propulsive eff = | 240 hp | 240 |
| Rpm to produce 236 hp = (236/240) × 5500 = | 5408 | 5500 |

TABLE II

Hull/Performance Data

Foil System

(1) Clb and Lift/drag
Cambered planes

| | | | | | |
|---|---|---|---|---|---|
| Stern | USN | report 3147 | Page 20 | AR = 67 Spray flow = 3 deg. | Cld = 1 Clb = 121 |
| | | | Page 15 | AR = 67 Spray flow = 3 deg. | Clb = 121 Lift/drag = 10.2/1 |
| Center | " | " | Page 20 | AR = 4 Spray flow = 3 deg | Cld = 1. Clb = 137 |
| | " | " | Page 3 | AR = .4 Spray flow = 3 deg | Clb = 137.Lift/drag = 9/ |
| Fwd | | | Page 20 | AR = .74 Spray flow = 3 deg. | Cld = 1 Clb = 115 |
| | | | Page 3 | AR = .74 Spray flow = 3 deg | Clb = .115. L/D = 9.6/1 |
| Bow foils | " | " | Page 20 | AR = .67 Water flow = 3 deg. | Cld = .1 Clb = 121 @ 0 deg rise |
| | " | " | | | Clb = 10 @ 11 degree rise |
| | | Page 15 Lift/drag = 10/1 | | | |

45 k

(2) Pressure

| | |
|---|---|
| Stern plane | 3508 |
| Center plane | 3549 |
| Fwd plane | 213 |
| Bow foils | 5742 |
| Hulls | 5742 |

(3) Lift and drag   45 k
Hulls a = Trim 3 deg × exp1 1 = 3.35 Y = Length/beam = 7.6/2.9 = 2.62. V = 76.01 f/s g = 32.2
cv = V/(gB) exp. 5 = 7.86. Cdl = [a exp 1.1(.012y exp.5 + .0095y exp2/cv exp2)] =
3.35(.0194 + .065/61.77) = 3.35(.0209) = .070 0 deg foil rise Cdl = .9 × 07 = .063
Lift = Cdlx pitot pressure × B × B × 2 = 063 × 5742 × 2.9 × 2.9 × 2 = 6084

45 k

Stern plane

| | |
|---|---|
| Lift = Clb × press × B × B | .121 × 3508 × 2 × 2 = 1698 |
| Drag = L/(L/D) | 1698/10.2 = 166 |

Center plane

| | |
|---|---|
| Lift = Clb × press × B × B | .137 × 3549 × 2 × 2 = 1944 |
| Drag = L/(L/D) | 1944/9.1 = 213 |

Fwd plane(8)

| | |
|---|---|
| Lift = Clb × press × B × B | .115 × 213 × 2 × 2 = 98 |
| Drag = L/(L/D) | 98/9.6 = 102 |

Bow Foils

| | |
|---|---|
| Lift = Clb × press × B × B | .1 × 5742 × 2 × 2 = 4594 |
| Drag = L/(L/D) | 4594/10 = 459 |

(4) Weight

Boat 4100#, engine & steering 1000#, foil system 500#, fuel 2500# 500 gal,
crew 400# & Misc 500# = Total weight 9000# + 1000# additional fuel and misc = 10000#

(5) Stern cambered plane(foil)   45 k

(a) Trim  deg

| | |
|---|---|
| 1 Stern plane vs center plane | 3 |
| 2 Center plane vs WL | 3 |
| 3 Stern plane vs WL | 6 |
| 4 Stern plane water flow | 3 |

(b) Height

| | |
|---|---|
| 1 Stern plane pitot aft vs WL | 0.15 |
| 2 Stern plane aft vs WL. Ht + .13 | 0.28 |

TABLE III

Hull/Performance Data

|  | Foil System 45 k |
|---|---|
| (5) Stern cambered plane(foil) | |
| 3 Stern plane fwd | |
| a Sin trim × 3     sin 6 × 3 | 0.314 |
| b 1698 × length × Cld = 1698 × 3 × 1 = | 0.051 |
| c.Stern plane aft | 0.28 |
|  | 0.645 |
| 4 Stern plane pitot fwd vs WL. Ht − .17 | 0.48 |
| (c) Pressure     .5 × density × f/s × f/s | |
| 1 Stern plane aft pitot | |
| 2 Stern plane fwd pitot | |
| 3 Stern plane ave pitot | 3508 |
| (d) Stern plane camber | |
| Length 3 ft | |
| x =     .1 .2 .3 .4 .5 .6 .7 .8 .9 1. | |
| x =     .3 .6 .9 1.2 1.5 1.8 2.1 2.4 2.7 3. | |
| y = −.0001 .001 .003 .006 .010 .013 .011 .003 −.017 −.051 | |
| (6) Center cambered planet (foil) | |
| (a) Trim     deg | |
| 1 Center plane vs fwd plane | 0 |
| 2 Center plane vs WL | 3 |
| 3 Center plane vs Spray flow | 3 |
| (b) Height | |
| 1 Center plane pitot aft vs WL | 0.48 |
| 2 Center plane aft vs WL. Ht + .13 | 0.61 |
| 3 Center plane fwd | |
| a. Sin trim × 5 | 0.262 |
| b. 1698 × length × Cld = .1698 × 5 × 1 = | 0.085 |
| c. Center plane aft | 0.61 |
|  | 0.96 |
| 4 Center plane pitot fwd −.17 | 0.79 |
| 5 Center plane pitot ave ht. | 0.64 |
| (c) Pressure     .5 × density × f/s × f/s | |
| 1 Center plane aft pitot | |
| 2 Center plane fwd pitot | |
| 3 Center plane ave | 3549 |
| (d) Center plane camber | |
| Length 60" | |
| x =     .1 2 3 4 .5 6 7 8 9 1 | |
| x =     6 12 18 24 30 36 42 48 54 60 | |
| y = 00 −.02 −.06 −12 −.2 −26 −.22 −05 34 1 02 | |
| (7) Fwd cambered plane(foil) | |
| (a) Trim     deg | |
| 1 Fwd plane vs WL | 8 |
| 2 Fwd plane vs Spray flow | 8 |

TABLE IV

Hull/Performance Data

|  | Foil System 45 k |
|---|---|
| (7) Fwd cambered plane(foil) | |
| (b) Height | |
| 1 Fwd plane pitot aft vs WL | 0.64 |
| 2 Fwd plane aft vs WL. Ht + 13 | 0.77 |
| 3 Fwd plane fwd | |
| a. Sin trim × (2 deg) | 0.105 |
| b 1698 × length × Cld = 1698 × 3 × 1 = | 0.051 |
| c Fwd plane aft | 0.77 |
|  | 1.87 |
| 4 Fwd plane pitot fwd − 17 | 1.7 |
| 5 Fwd plane pitot ave ht | 1.58 |
| (c) Pressure     5 × density × f/s × f/s | |
| 1 Fwd plane aft pitot | 392 |
| 2 Fwd plane fwd pitot | 7 |
| 3 Fwd plane ave | 215 |
| (d) Center plane camber | |
| Length 32 4" | |
| x =     1 2 3 4 5 6 7 8 9 10 | |
| x =     0 3.6 7.2 10.8 14.4 18 21.6 25.2 28.8 32.2 | |
| y = 0 −.01 −.04 −.07 −.12 −.16 −.12 −.04 .2 .61 | |
| (8) Bow Foils | |
| (a) Trim fwd foils vs WL | 3 deg |
| (b) Pressure | 5742 |
| Bow foil camber | |
| Length 3 ft | |
| x =     .1 .2 .3 4 .5 .6 .7 .8 .9 1. | |
| x =     .3 .6 .9 1.2 1.5 1.8 2.1 2.4 2.7 3. | |
| y = −.0001 .001 .003 .006 .010 .013 .011 .003 −.017 −051 | |

| | | A 45 k | | | | |
|---|---|---|---|---|---|---|
| | | Cambered planes | | | Bow | |
| (9) Wetted surface | | Stern | Center | Fwd | Foils Hulls | Total |
| Horizontal | Water | | | | | |
| | Width ave | | | | 2.9 | |
| | Length | | | | 7.6 | |
| | Number | | | | 2 | |
| | Area | | | | 44.1 | 44.1 |
| Vertical | Water | | | | | |
| | Height ave | 0.25 | | | 0.15 | 0.6 |
| | Length | 3 | | | 2 | 7.6 |
| | Number | 2 | | | 4 | 4 |
| | Area | 1.5 | | | 1.2 18 | 24.7 |
| | Spray | | | | | |
| | Height ave | 0.25 | 6 | 1.8 | | |
| | Length | 3 | 5 | 2.7 | | |
| | Number | 2 | 2 | 2 | | |
| | Area | 1.5 | 6 | 9.7 | | 17.2 |

TABLE V

Hull/Performance Data

| Foil System | 45 k |
|---|---|
| (10) Vertical drag | |
| A 45k | |
|     (a) Cf Schoenherr @ Reynolds no | 76 01 f/s |
|         Reynolds no = velocityx (length/viscosity) | |
|             Length = 26.25. | |
|             Viscosity = @ 50 deg salt = $1.46 \times 10^{-5}$ | |
|             Reynolds no = $76.01 \times 26.25/1.46 \times 10^{-5}$ | $1\,366 \times 10^{+8}$ |
|         Cf @Rey no = $1\,366 - (1.366 - 1\,060) \times 12/2 =$ | $1\,182 \times 10^{-3}$ |
|     (b) Pitot pressure | |
|         Lift | 10000 |
|         Water $.5 \times 64/32.2 \times 76\,01 \times 76.0\,1 =$ | 5742 |
|         Spray- Stern plane | 3508 |
|         Center plane | 3549 |
|         Fwd plane | .213 |
|     (c) Frictional resistance. Cf × press × area | |
| Stern plane | |
| Water    $1\,182 \times 10^{-3} \times 1.5 \times 3805$ | 6.1 |
| Spray    $1.182 \times 10^{-3} \times 1.5 \times 3805$ | 6.1 |
| Center plane | |
| Spray    $1.182 \times 10^{-3} \times 6 \times 3549$ | 25.2 |
| Fwd plane | |
| Spray    $1.182 \times 10^{-3} \times 9.7 \times 213$ | 2.4 |
| Fwd Foils | |
| Water    $1.182 \times 10^{-3} \times 1.2 \times 5742$ | 8.1 |
| Hulls | |
| Water Hor    $1.182 \times 10^{-3} \times 44.1 \times 5742$ | 299 |
| Vert    $1.182 \times 10^{-3} \times 181 \times 5742$ | 121 |
|     (d) Residual resistance-Tan Trimx Lift-Horizontal only | |
| Hulls   $3670 \times \tan 5\deg = 3670 \times .0875$ | 321 |
|     (e) Hull lift/drag | |
|         3670/Resistance friction & residual | |
|         $3670/(299 + 321) = 5.91$ | |
| (11) Propeller | |
| (12) Appendage resistance | |
|     (a) normal .04 × frictional and residual resistance = Drag | 1181 |
|         Appendage resistance @8% | 94 |
| (13) Wind resisrtance | |
|     (a) Cwx 5x 0024xvxvxArea | |
|         Cw. = 1.28. Area = $6\,2 \times 2 + 8.3 \times 2.75 + 4 \times 35 = 49.250$ | |
|         $1.28 \times 49.3 \times .5x\,0024 \times 76\,01 \times 76.01 =$ | 437 |

TABLE VI

Hull/Performance Data

| Foil System | 45 k |
|---|---|

Revised
(3) Lift and drag

Hulls  a = Trim 3 deg × exp1 .1 = 3 35 Y = Length/beam = 3/2.9 = 1.03. V = 76 01f/s g = 32 2
    cv = $V/(gB)^{.5}$ = 7.86 Cdl = [a exp 1 1(.012y exp.5 + .0095y exp2/cv exp2)] =
    3.35(.0121 + .010/61.77) = 3 35(.0121 + 0006) = .042. 0 deg foil rise Cdl = 9 × 042 = .038
    Lift = Cdlx pitot pressure × B × B × 2 = 038 × 5742 × 2 9 × 2.9 × 2 = 3670
(9) Wetted surface    A 45 k TABLE VI-continued Hull/Performance Data Hulls

| | Horizontal | Water | (c) Frictional resistance Cf × press × area | |
|---|---|---|---|---|
| | | Width ave | 2 9 | Hulls |
| | | Length | 3 | Water Hor 1.182 × 10 exp −3 × 17 4 × 5742  117 |
| | | Number | 2 | Vert 1 182 × 10 exp −3 × 7 2 × 5742  48 |
| | | Area | 174 | |
| | Vertical | Water | | |
| | | Height ave | 06 | |
| | | Length | 3 | |
| | | Number | 4 | |
| | | Area | 72 | |

(3) Lift and drag

| Bow Foils | Lift = | | =2584 |
|---|---|---|---|
| | Drag = L/(L/D) | | 2584/10 = 258 |

(d) Residual resistance-Tan Trimx Lift-Horizontal only

| Hulls | Residual 3670 tan 5 deg | 321 |
|---|---|---|
| | Frict horizontal | 117 |
| | vertical | 48 |
| | | 486 |

A method for calculating the enhanced performance of the preferred embodiments is indicative of the highly desirable features of the present invention. The method for calculating the amount of enhancement of performance from modifying the boat with cambered bow, forward and/or center tunnel and stern foils, includes the steps of:

Defining before modification the boat height above waterline, wetted surface, trim angle, drag, weight, horse power and revolutions per minute vs speed. TABLE III shows cambered foils for calculating the enhanced performance from sea trials of a catamaran 26.5 feet in length with weight of 10000 pounds and 400 rated hp requires 5500 rpm to reach 41 mph;

Defining modifications: the dimensions of the bow, forward tunnel, center tunnel and stern cambered foils; length, beam, aspect ratio, camber coefficient, trim angle of water flow, degrees of floor rise and weight. Specific dimensions are shown in the accompanying TABLES, particulary the specifications of the bow, stern, center and forward cambered foils;

Defining foil lift: based on lift coefficient, pressure and foil beam. Lift coefficient is estimated from aspect ratio, camber coefficient and trim angle of water flow and was obtained from a US Navy report "Graphs For Designing Cambered Planing Surfaces." Pressure is based on cambered foil speed vs height above water obtained from regression calculations from sea trial data of prototype cambered foils, showing (1) Clb and Lift/drag; (3) Lift and drag; (5) Stern foil trim, height, pressure and camber; (6) Center foil trim, height, pressure and camber; (7) Forward foil trim, height, pressure and camber. (8) Bow foil trim, height, pressure and camber; (9) Wetted surface; (10) Vertical drag; (12) Appendage resistance; (13) Wind resistance; (3) Lift and drag; and (9) Wetted surface. Revisions are required to have lift equal to craft weight of 10000 lbs;

Defining foil drag: based on foil lift/(lift/drag ratio). Lift/drag ratio was obtained from US Navy report 3147 and was based on aspect ratio, lift coefficient and trim angle of water. Vertical drag was estimated from vertical wetted surface times coefficient of friction. Drag, (9) wetted surface and revised drag of 1711 lbs;

Defining after modification hull lift: based on lift coefficient, pressure and beam (3) shows hull lift and (2) shows pressure;

Defining after modification hull drag including: based an frictional resistance, reduced hull wetted surface, coefficient of friction, residual hull resistance, wind and appendage resistance. The data shows revised hull drag and wetted surface; (10) frictional resistance, (12) appendage resistance and (13) wind resistance;

Defining speed vs. horsepower before and after modification with cambered foils: based on speed equal to propulsive horsepower×550 divided by foil and hull drag where propulsive hp equals 0.6 times rated horsepower times required divided by rated rpm. Performance shows 400 rated hp requires 5408 rpm to achieve 51.8 mph; and Defining the amount of enhanced performance: based on the above method of calculation indicates a 26.6 ft catamaran with 400 horsepower had a speed of 41 mph before modification compared to 51.8 mph after modification with cambered foils, an increase of 26%.

Enhanced performance of the preferred embodiments during sea trials of a 23 ft prototype with 275 hp at 82% of rated rpm in smooth water showed the bow and stern foils generated lift of 58% of craft weight of 4048 lbs (including passengers and fuel, raised hull, reduced wetted surface and increased hull speed of 9.2% to 45 knots). In rough water to reduce pitching and the risk of flipping at high speeds going into rough waves the bow height and lowering the stern foils reduced trim. This increases the stern foil lift and reduces the angle of attack on the bow foils that reduces the bow lift and generates bow down stern lift.

Increasing the angle of attack (x) of the propeller shaft also reduces the angle of attack on the bow foils and which reduces bow lift and height. The bow height and trim was increased by lowering the propeller shaft angle to raise the stern foils to prevent the bow from diving in a following, rough sea. Trials were conducted in waves height of 3.7 ft and winds of 55 knots. The 23 foot prototype at 3000 of rated 5500 rpm speed without foils in a head sea was 10 k or less. The addition of the bow and stern foils increased the speed to 22 knots reduced the pitch to 63% or 17 degrees and vertical acceleration g loading to 58% or 5 g. The foil system increased the moment of inertia by over 5 times. Increased moment of inertia reduces pitching, vertical accelerations and wave shock and improved top speed, stability and comfort in rough water.

The method for calculating the amount of enhancement of performance from modifying different boats with cambered bow, tunnel and stern foils indicated increased speed, lift/drag ratios and efficiency with reduced propulsive power. This method for calculating performance indicated a US Navy 23 foot test craft required 134.4 propulsive hp without foils at 40.7 knots and 135.5 propulsive hp with foils at 44.5 knots compared to actual propulsive hp of 135 in actual sea trials.

Dense spray generated by the cambered bow foils flowing thru the rigid airtight adjustable cambered stern foils dampens pitch and vertical accelerations in a rough sea. The method for calculating enhanced performance was based on sea trials in smooth and rough water. Trial data was obtained on: density of tunnel spray, speed, pitch, roll and vertical acceleration vs. engine rpm, power, weight and wave height from a 23 ft prototype with 275 horsepower with and without cambered foils. Calculating methods were developed based on this and other data to estimate lift and resistance from the hulls, bow, tunnel and stern cambered foils at different engine rpm and power. This method of calculation accurately predicted lift, resistance and speed vs power for the prototype with and without foils installed.

The lift/resistance ratio was 29% higher with the foils installed than without the foils installed. The U.S. Navy tested the prototype and recommended "the foil system as tested appears to improve craft performance in a seaway." "The foil system prevents the bow from diving in following seas or pitching in a head sea; reduces the g-loading in a Beam sea; and finally, increases the craft speed at the top end. We recommended that the foil system concept be considered for application and evaluation of future U.S. Navy hulls."

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A boat hull comprising:
   a bow and a stern;
   a waterline extending between said bow and said stern;
   a tunnel extending axially in a direction from said bow toward said stern and having a forward end, a center region and an aft end;
   a pair of flexible cambered bow foils, said flexible cambered bow foils supported on sides of said bow beneath the water line, said flexible cambered foils being capable of controlling a flow within said at least one tunnel and creating a dense spray in an end of said tunnel while cushioning shock and lifting said bow; and
   a first adjustable cambered tunnel foil being adjustably positioned within said tunnel and generating lift from a pressure being generated by the dense spray within said tunnel.

2. The boat hull according to claim 1, further comprising a second cambered tunnel foil at either the aft end or at the forward end of said tunnel generating lift from a pressure being generated by the dense spray within said tunnel.

3. The boat hull according to claim 1, said boat hull further comprising a v-bottom or rigid inflatable hull.

4. The boat hull according to claim 1, said boat hull further comprising a catamaran hull.

5. The boat hull according to claim 1, wherein at least one of said foils includes a foil assembly, said foil assembly including
   a main cantilevered, flexible cambered metal foil,
   a rubber shock pad,
   reinforcing material,
   a bolt plate, and
   a bolt and lock nut assembly.

6. A boat hull comprising:
   a bow and a stern;
   a waterline extending between said bow and said stern;
   a tunnel extending axially in a direction from said bow toward said stern and having a forward end, a center region and an aft end;
   a pair of flexible cambered bow foils, said flexible cambered bow foils supported on sides of said bow beneath the water line, said flexible cambered foils being capable of controlling a flow within said at least one tunnel and creating a dense spray in an end of said tunnel while cushioning shock and lifting said bow;
   a first cambered tunnel foil being positioned within said tunnel and generating lift from a pressure being generated by the dense spray within said tunnel; and
   a rigid cambered stern foil forming a skirt extending substantially across the tunnel and peripherally enclosing a transom of said stern, said stern foil being capable of preventing air from escaping, compressing said dense spray and thereby lifting said stern.

7. The boat hull according to claim 6, wherein said first cambered tunnel foil is a center tunnel cambered foil between said forward end and said center region of said tunnel and is fixed or variable in height, and said stern cambered stern foil is variable in height and or in trim so as to control the lift of said hull.

8. A boat hull comprising:
   a bow and a stern, said stern including a transom;
   a waterline extending between said bow and said stern;
   a pair of tunnels extending axially in a direction from said bow toward said stern, wherein each of said tunnels includes a forward end, a center region and an aft end;
   a pair of flexible cambered bow foils, said flexible cambered bow foils supported on sides of said bow beneath the water line, said flexible cambered bow foils being capable of controlling a flow within said tunnels and creating a dense spray in an end of said tunnel while cushioning shock and lifting said bow; and
   a pair of cambered tunnel foils being positioned within said tunnels, respectively, wherein each of said tunnels includes a respective tunnel foil generating lift from a pressure being generated by the dense spray within said respective tunnel.

9. The boat hull according to claim 8, wherein said tunnel foils are positioned at said forward ends of said tunnels.

10. The boat hull according to claim 9, further comprising a pair of cambered stern foils forming a skirt extending substantially across said tunnels so as to peripherally enclose said transom and prevent air from escaping, compressing said dense spray and lifting thereby said stern.

11. The boat hull according to claim 8, wherein said tunnel foils are positioned at said center regions of said tunnels.

12. The boat hull according to claim 11, further comprising a pair of cambered stern foils forming a skirt extending substantially across said tunnels so as to peripherally enclose said transom and prevent air from escaping, compressing said dense spray and lifting thereby said stern.

13. The boat hull according to claim 8, further comprising a pair of cambered stern foils forming a skirt extending substantially across said tunnels so as to peripherally enclose said transom and prevent air from escaping, compressing said dense spray and lifting thereby said stern.

14. The boat hull according to claim 8, said boat hull further comprising a v-bottom or rigid inflatable hull.

15. The boat hull according to claim 8, said boat hull further comprising a catamaran hull.

16. A method for obtaining enhanced lift, performance and rough water stability with cambered tunnel and bow foils, said method comprising the steps of:

(a) defining a boat height above a waterline, a wetted surface area, a trim angle, a hull weight and a horse power vs. speed requirement;

(b) defining dimensions of the cambered foils and hull, said dimensions including length, beam, camber, trim, floor rise and weight;

(c) defining foil lift and drag based on said cambered foil dimensions, trim, spray density, speed, height above waterline, wetted surface area, coefficient of friction and sea trial data from prototype cambered foils;

(d) modifying a hull with a hull modification to incorporate said cambered foils, wherein said modified hull includes
a bow and a stern;
the waterline extending between said bow and said stern;
a tunnel extending axially in a direction from said bow toward said stern and having a forward end, a center region and an aft end;
a pair of flexible cambered bow foils, said flexible cambered bow foils supported on sides of said bow beneath the water line, said flexible cambered bow foils being capable of controlling a flow within said tunnel and creating a dense spray in an end of said tunnel while cushioning shock and lifting said bow; and
a first adjustable cambered tunnel foil being positioned within said at least one tunnel and generating lift from a pressure being generated by the dense spray within said at least one tunnel; and (e) defining hull lift and drag aft the hull modification based on water pressure, beam, length, trim, velocity, gravity, coefficient of friction, floor rise, wetted surface, residual hull resistance, appendage and wind resistance.

17. The method according to claim 16, further comprising:

(f) defining the speed vs. horsepower before and after said hull modification with cambered foils; and (g) calculating enhanced performance.

18. A boat hull comprising:
a bow and a stern;
a waterline extending between said bow and said stern;
a tunnel extending axially in a direction from said bow toward said stern and having a forward end, a center region and an aft end;
a pair of flexible cambered bow foils, said flexible cambered bow foils supported on sides of said bow beneath the water line, said flexible cambered foils being capable of controlling a flow within said at least one tunnel and creating a dense spray in an end of said tunnel while cushioning shock and lifting said bow;
a first cambered tunnel foil being positioned within said tunnel and generating lift from a pressure being generated by the dense spray within said tunnel;
a second cambered tunnel foil at either the aft end or at the forward end of said tunnel generating lift from a pressure being generated by the dense spray within said tunnel; and
a rigid cambered stern foil forming a skirt extending substantially across the tunnel and peripherally enclosing a transom of said stern, said stern foil being capable of preventing air from escaping, compressing said dense spray and thereby lifting said stern.

19. The boat hull according to claim 18, wherein said first cambered tunnel foil is a center tunnel cambered foil between said forward end and said center region and is fixed or variable in height, and said stern cambered stern foil is variable in height and or in trim so as to control the lift of said hull.

20. A catamaran boat hull comprising:
a bow and a stern;
a waterline extending between said bow and said stern;
a tunnel extending axially in a direction from said bow toward said stern and having a forward end, a center region and an aft end;
a pair of flexible bow cambered foils supported on sides of said bow beneath the water line, said flexible bow cambered foils being capable of controlling a flow within said at least one tunnel and creating a dense spray in said tunnel while cushioning shock and lifting said bow; and
a first adjustable tunnel cambered foil being adjustably positioned within said tunnel and generating lift from a pressure being generated by the dense spray within said tunnel.

21. The catamaran boat hull according to claim 20, further comprising a second tunnel cambered foil at either the aft end or at the forward end of said tunnel generating lift from a pressure being generated by the dense spray within said tunnel.

22. The boat hull according to claim 20, wherein at least one of said cambered foils includes a foil assembly, said foil assembly including
a main cantilevered, flexible cambered metal plane,
a rubber shock pad,
reinforcing material,
a bolt plate, and
a bolt and lock nut assembly.

23. A catamaran boat hull comprising:
a bow and a stern;
a waterline extending between said bow and said stern;
a tunnel extending axially in a direction from said bow toward said stern and having a forward end, a center region and an aft end;
a pair of flexible bow cambered foils supported on sides of said bow beneath the water line, said flexible bow cambered foils being capable of controlling a flow within said at least one tunnel and creating a dense spray in said tunnel while cushioning shock and lifting said bow;
a first tunnel cambered foil being positioned within said tunnel and generating lift from a pressure being generated by the dense spray within said tunnel; and a rigid stern cambered foil extending substantially across the tunnel and a stern skirt peripherally enclosing a transom of said stern, said stern cambered foil and stern skirt being capable of preventing air from escaping, compressing said dense spray, and thereby lifting said stern.

24. The catamaran boat hull according to claim 23, wherein said first tunnel cambered foil is a center tunnel cambered foil between said forward end and said center region of said tunnel and is fixed or variable in height, and said stern cambered stern foil is variable in height and or in trim so as to control the lift of said hull.

25. A boat hull comprising:
a bow and a stern, said stern including a transom;
a waterline extending between said bow and said stern, wherein said boat hull is a V bottom or a rigid inflatable hull;
a pair of tunnels, wherein said tunnels are enclosed fore and aft by a chine aerofoil hull skirt extending along sides of said hull from a point of attachment of said hull skirt to the transom, and said tunnels extend axially in a direction from said bow toward said stern;
a pair of flexible bow cambered foils supported on sides of said bow beneath the water line, said flexible bow cambered foils being capable of controlling a flow within said tunnels and creating a dense spray in said tunnels while cushioning shock and lifting said bow; and
a pair of tunnel cambered foils, said tunnel cambered foils generating lift from a pressure being generated by the dense spray and water within said respective tunnels.

26. The boat hull according to claim 25, wherein said pair of tunnel cambered foils are attached to the hull.

27. The boat hull according to claim 26, wherein said pair of tunnel cambered foils are attached to the chine aerofoil hull skirt.

28. The boat hull according to claim 26, further comprising a pair of stern cambered foils extending substantially across said tunnels and a stern skirt so as to peripherally enclose said transom and prevent air from escaping, for compressing said dense spray and water, and thereby lifting said stern.

29. The boat hull according to claim 28, wherein said pair of stern cambered foils are attached to a variable stern foil.

30. The boat hull according to claim 25, wherein said pair of tunnel cambered foils are attached to the chine aerofoil hull skirt.

31. The boat hull according to claim 25, further comprising a rigid stern cambered foil extending substantially across the tunnel and a stern skirt peripherally enclosing a transom of said stern, said stern cambered foil and stern skirt being capable of preventing air from escaping, compressing said dense spray, and thereby lifting said stern.

32. The boat hull according to claim 31, further comprising a pair of stern cambered foils extending substantially across said tunnels and a skirt so as to peripherally enclose said transom and prevent air from escaping, for compressing said dense spray and water, and thereby lifting said stern.

33. The boat hull according to claim 25, wherein at least one of said cambered foils includes a foil assembly, said foil assembly including
a main cantilevered, flexible cambered metal plane,
a rubber shock pad,
reinforcing material,
a bolt plate, and
a bolt and lock nut assembly.

34. A method for obtaining enhanced lift, performance and rough water stability with cambered tunnel and bow foils, said method comprising the steps of:
(a) defining a boat height above a waterline, a wetted surface area, a trim angle, a hull weight and a horse power vs. speed requirement;
(b) defining dimensions of the cambered foils and hull, said dimensions including length, beam, camber, trim, floor rise and weight;
(c) defining foil lift and drag based on said cambered foil dimensions, trim, spray density, speed, height above waterline, wetted surface area, coefficient of friction and sea trial data from prototype cambered foils;
(d) modifying a hull with a hull modification to incorporate said cambered foils, wherein said modified hull includes
a bow and a stern;
the waterline extending between said bow and said stern;
a tunnel extending axially in a direction from said bow toward said stern and having a forward end, a center region and an aft end;
a pair of flexible cambered bow foils, said flexible cambered bow foils supported on sides of said bow beneath the water line, said flexible cambered bow foils being capable of controlling a flow within said tunnel and creating a dense spray in an end of said tunnel while cushioning shock and lifting said bow;
a first cambered tunnel foil being positioned within said at least one tunnel and generating lift from a pressure being generated by the dense spray within said at least one tunnel, and
a rigid cambered stern foil forming a skirt extending substantially across the tunnel and peripherally enclosing a transom of said stern, said stern foil being capable of preventing air from escaping, compressing said dense spray and thereby lifting said stern; and
(e) defining hull lift and drag aft the hull modification based on water pressure, beam, length, trim, velocity, gravity, coefficient of friction, floor rise, wetted surface, residual hull resistance, appendage and wind resistance.

* * * * *